United States Patent [19]
Kanai et al.

[11] Patent Number: 4,643,846
[45] Date of Patent: Feb. 17, 1987

[54] PROCESS FOR THE TREATMENT OF RADIOACTIVE SODIUM

[75] Inventors: Makoto Kanai, Yokohama; Hideaki Aikawa, Mito; Eiichi Inada, Mito; Katsuyuki Ohtsuka, Mito, all of Japan

[73] Assignee: Doryokuro Kakunenryo Kaihatsu Jigyodan, Tokyo, Japan

[21] Appl. No.: 673,176

[22] Filed: Nov. 19, 1984

[30] Foreign Application Priority Data

Nov. 28, 1983 [JP] Japan .................. 58-223767

[51] Int. Cl.⁴ ................................. G21F 9/00
[52] U.S. Cl. ..................... 252/626; 252/628; 252/629; 252/631; 376/310
[58] Field of Search ............. 252/626, 628, 629, 631, 252/632; 376/310

[56] References Cited

U.S. PATENT DOCUMENTS 3,298,961  1/1967  Davis et al. ............... 252/631 X
4,028,265  6/1977  Barney et al. .............. 252/626
4,230,597 10/1980  Bustard et al. ............ 252/631 X

OTHER PUBLICATIONS

Takasaki et al., "Removing Mercury from Amalgam Decomposition Tower", Japan 73 01,598, 18 Jan. 1973.
Lutton et al., "Sodium Removal and Decontamination of LMFBR Components for Maintenance", Atomic Energy Review, 18 4 (1980) pp. 615–692.

Primary Examiner—Deborah L. Kyle
Assistant Examiner—John S. Maples
Attorney, Agent, or Firm—Wenderoth, Lind & Ponack

[57] ABSTRACT

A process for the treatment of radioactive sodium is provided which comprises the steps of forming radioactive sodium amalgam by mixing radioactive sodium with mercury; reacting the radioactive sodium amalgam with water to form mercury and radioactive sodium hydroxide; recycling the mercury into the step of forming radioactive sodium amalgam to be mixed with the radioactive sodium; and solidifying the radioactive sodium hydroxide in the presence of a solidifying material to be confined in a stable solidified body.

6 Claims, 3 Drawing Figures

PROCESS FOR THE TREATMENT OF RADIOACTIVE SODIUM

BACKGROUND OF THE INVENTION

The present invention relates to a process for the safe treatment of radioactive sodium which was formed by the contamination with radioactive substances or by the radioactivation of liquid sodium used as sodium coolant for fast breeder reactors or in a fused fuel-liquid sodium interaction test.

Conventional methods for the treatment of sodium, regardless of whether it is radioactive or not, include (1) a method wherein sodium is heated to be reacted with water and oxygen in air by combustion, yielding $Na_2O$, $Na_2O_3$, and $NaOH$; (2) a method wherein sodium is reacted with steam to form $NaOH$; (3) a method wherein sodium is reacted with an alcohol to form an alcoholate; and (4) a method wherein sodium is reacted with carbon dioxide gas or dry ice to form sodium carbonate. However, these methods have the following problems which must be solved in treating radioactive sodium. In method (1), fine smoke generated during combustion comprises radioactive sodium, the recovery or removal of which is very difficult. In method (2), the reaction must be conducted with great care. In method (3), large amounts of an alcohol is necessary because the solubility of sodium in the alcohol is small, and the waste alcohol must be disposed after the proper treatment. In method (4), large amounts of a gas must be treated and sodium must be stirred under heating to proceed the reaction because unreacted sodium is likely to remain in the central part of a reacting vessel.

The radioactivity of liquid sodium which was used in a fast breeder reactor and has reached a radioactive equilibrium is several m Ci/kg. Na. In the treatment of radioactive sodium having such radioactivity, particular attention should be given to the following points:

(a) The amount of the radioactive substances entrained with an exhaust gas to be released to external environments should be as small as possible.

(b) The reaction should be stable, controlled easily and securely, without a fear of explosion.

(c) The amount of wastes, e.g. waste liquor, discharged out of the facilities should be as small as possible.

(d) The process should be a simple one not necessitating so many secondary materials.

(e) The apparaus should be made compact.

(f) The radioactive corrosion materials entrained with the radioactive sodium should be simultaneously treated.

(g) From the viewpoint of the stability during temporary storage, the maintenance in the form of an alkaline or salt solution or of powder has a danger of leakage or scattering so that the radioactive substances should be maintained in a more stable form for example, as a vitrified body.

SUMMARY OF THE INVENTION

An object of the present invention is to overcome the disadvantages of the conventional methods described hereinbefore.

A further object of the present invention is to provide an improved process for the treatment of radioactive sodium, which can satisfy all of the requirements described above.

In the process of the treatment of radioactive sodium according to the present invention, radioactive sodium amalgam is first formed by mixing radioactive sodium with mercury. The resulting radioactive sodium amalgam is then reacted with water to form mercury and radioactive sodium hydroxide. The thus formed mercury is recycled into the step of forming radioactive sodium amalgam to be mixed with the radioactive sodium. The radioactive sodium hydroxide, on the other hand, is solidified in the presence of a solidifying material to be confined in a stable solidified body.

In one embodiment of the present invention, the radioactive sodium hydroxide may be solidified after it is neutralized with an acid.

The solidifying material may be selected from a vitrifiable substance, e.g. glass, a plastics, a cement or an asphalt.

Additional objects and features of the present invention will become apparent from the detailed description of preferred embodiments of the invention, which will be made with reference to the accompanying drawings.

BRIEF DESCRIPTION OF THE DRAWINGS

FIG. 3 illustrates a portion of the process flow shown in FIG. 1 which is modified when radioactive substances produced in the present invention are solidified with cement or the like.

PREFERRED EMBODIMENT OF THE INVENTION

The present invention will now be described in more detail with reference to a preferred embodiment of the present invention.

Figure 1:
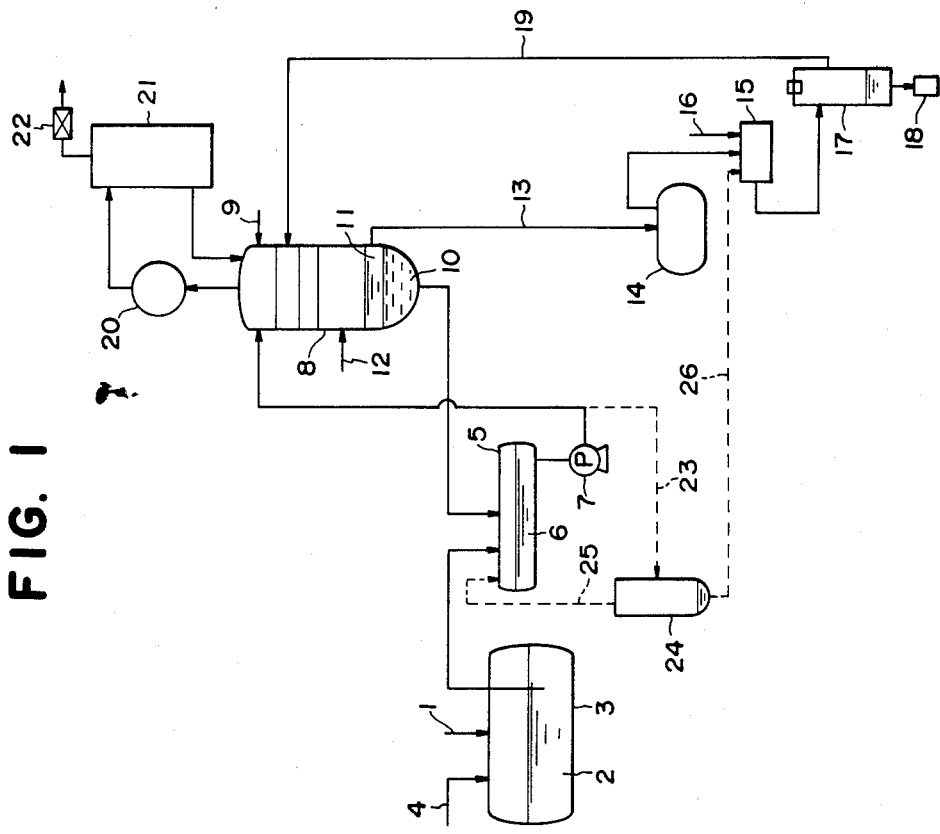
FIG. 1 illustrates an example of the process flow according to the present invention.

Referring to FIG. 1 illustrating an example of a process flow according to the present invention, radioactive sodium 2, supplied through a conduit 1 or by means of a metal drum, is stored in a sodium storage vessel 3, heated appropriately, and delivered to a sodium-mercury mixer 5 by the pressure of an inert gas which is supplied through an inert gas conduit 4. In this sodium-mercury mixer 5, the radioactive sodium heated at around 180° C. and mercury 10 drawn out of the bottom of an amalgam decomposition tower or denuding tower 8, which will be described below, or purified mercury 25 supplied from a mercury purifying means 24 are mixed to form a radioactive sodium amalgam 6 containing about 0.2 to 0.3% by weight of sodium. The sodium amalgam 6 is then transported to the denuding tower 8 through a mercury pump 7 to be reacted with a trace amount of water supplied from a conduit 9, so that the sodium amalgam is decomposed to produce mercury 10 and a solution 11 containing about 50% by weight of radioactive sodium hydroxide in the bottom portion of the tower 8. An inert gas may be introduced optionally for safety through a conduit 12.

The mercury 10 drawn out of the bottom of the denuding tower 8 is supplied to the sodium-mercury mixer 5 as described above. The radioactive sodium hydroxide solution 11, which is floating on the layer of the mercury 10, is tentatively stored in a storage vessel 14 through a conduit 13, and then delivered to a mixer 15 to be mixed with an appropriate amount of vitrifiable substance, e.g. glass 16 as a solidifying material. The mixture is heated in a heat-melting furnace 17, in which the sodium hydroxide solution is heat-dried and at the same time the resulting solid sodium hydroxide is confined in a vitrified body 18. The vitrified body thus obtained is then taken out of the furnace. The vitrifiable substances include, for example, silicate compounds, aluminum oxide, magnesium oxide, and mixtures thereof. A melting point depressant such as $B_2O_3$ may be added in order to lower the melting point of these vitrifiable substances. Considering the safety in the treatment or the soundness of the vitrified body, dilution of the alkalinity of the radioactive sodium hydroxide, which is strongly alkaline, or addition of an acid to the radioactive sodium hydroxide to form a salt such as sodium nitrate, sodium sulfate, or sodium carbonate, may be conducted before the melt-solidification with the vitrifiable substance 16 to form the vitrified body 18. The vitrified body 18 may be formed by either a continuous or a batch method.

The exhaust gas discharged from the heat-melting furnace 17 contains water. This water is recycled to the denuding tower 8 through a conduit 19 to be reacted with radioactive sodium amalgam as described above.

The water and mercury contained in the exhaust gas discharged from the denuding tower 8 are supplied to a recovery tower 20, which is cooled with cooling water, to be separated from each other for recovery, and returned to the denduing tower 8. The exhaust gas discharged from the recovery tower 20, therefore, contains only hydrogen and a trace amount of mercury entrained with the exhaust gas. In order to deprive the exhuast gas of this trace amount of mercury, the exhaust gas is passed through a mercury removal tower 21 packed with an adsorbent, for example, a chelate resin over a certain residence time, whereby the mercury is adsorbed by the adsorbent. The exhaust gas is discharged from the mercury-removal tower 21, optionally through a HEPA filter to remove the radioactive substances, to the outer atmosphere. Since the final exhaust gas comprises hydrogen alone, the amount of the water to be supplied through the conduit 9 to the denuding tower 8 will be satisfactory if it corresponds to the amount of the exhaust hydrogen.

Radioactive corrosion materials, for example, metals such as cobalt, manganese, or iron and oxides thereof, may sometimes be entrained with the radioactive sodium 2 as impurities to contaminate the radioactive sodium amalgam 6. In that case, a part of the sodium amalgam 6 containing the radioactive impurities supplied from the mercury pump 7 is delivered through a branch pipe 23 shown by a dotted line in FIG. 1 to a mercury purifying means 24 where it is heated to form vaporzied mercury and a residue containing radioactive impurities. The vaporized mercury is then supplied to the sodium-mercury mixer 5 as purified mercury 25. The impurities-containing residue is supplied through a conduit 26 and the mixer 15 into the heat-melting furnace 17, to be incorporated, for example, in the vitrified body 18 together with the radioactive sodium hydroxide supplied from the denuding tower 8.

Figure 3:
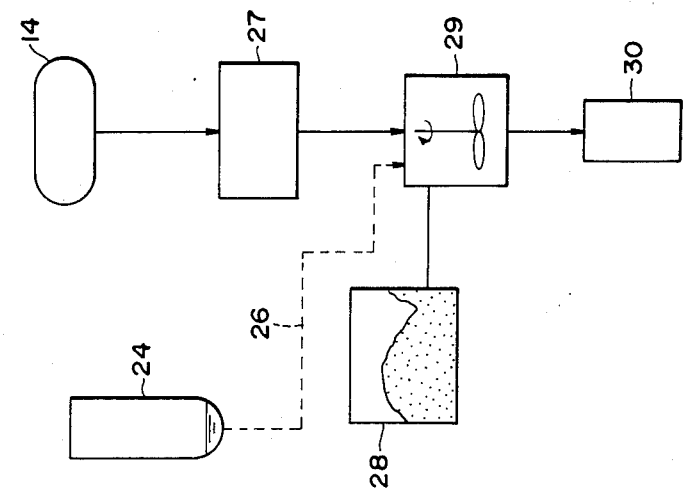

The detail of the vitrification process using glass is as described above. Plastics, cement, or other known solidifying materials can of course be used. When using these materials, sodium hydroxide is supplied from the storage vessel 14 of FIG. 1 to a neutralizing means 27 shown in FIG. 3, where the sodium hydroxide is neutralized with an appropriate amount of an acid. The sodium hydroxide thus neutralized is then supplied to an agitator 29, together with the impurities separated in the mercury purifying means 24 and transported through the conduit 26. Plastics, cement, asphalt, or other solidifying material are simultaneously supplied from a solidifying material feeder 28 to the agitator 29. The radioactive sodium hydroxide or its salt is thus filled and solidified in these solidifying materials and stored in a solidified body container 30.

As understood from the above description, radioactive sodium is tentatively amalgamated and then converted into radioactive sodium hydroxide suitable for solidification in the present invention. The treatment method of the present invention is therefore advantageous in that the reaction can be very easily controlled and radioactive substances can be safely and securely treated in small facilities. Moreover, there are no fear of leakage or scattering of the radioactive sodium, because the sodium is, whether it is in the form of solution, slurry, or solid, or whether it is neutralized or converted into a salt by the addition of an acid, solidified with a solidifying material and confined in a stable solidified body.

In the present invention, the mercury obtained by reacting the radioactive sodium amalgam with water is recycled to the preceding step of forming sodium amalgam, and the water contained in the exhaust gas generated during the heat-melting of the radioactive sodium hydroxide with the vitrifying material is recycled to the step of the reaction of the sodium amalgam with water. Since the material balance in the use of mercury and water as described above can be favorably adjusted in the present invention, the process can be carried out in a closed circuit. Those which are discharged outside by the method of the present invention comprise hydrogen and the solidified body alone. Thus, the amount of the water to be supplied will be sufficient if it can make up the discharged hydrogen. The radioactive corrosion materials entrained with the radioactive sodium can be simultaneously treated by the method of the present invention. The present invention thus provides a remarkably excellent method of advantageously treating radioactive sodium.

It is evident that radioactive sodium can be treated by the above-described closed circuit process also in the case where cement or other solidifying materials are used in place of glass, by heat-drying the radioactive sodium hydroxide preliminarily and recycling the formed water to the denuding tower 8 through the conduit 19 in the same manner as described above.

The present invention will be more readily understood by the following example.

According to the process flow shown in FIG. 1, sodium amalgam was prepared it the sodium-mercury mixer 5 and reacted with water in the denuding tower 8, whereby a solution containing about 50% by weight of radioactive sodium hydroxide and mercury were obtained. The mercury was recycled to the sodium-mercury mixer 5, while the radioactive sodium hydroxide solution was heat-melted, afer an appropriate amount of silicon dioxide was added thereto, at about 1200° C. in the microwave heat-melting furnace 17, yielding sodium silicate in the form of a stable vitrified body. The reaction is represented by the following formula:

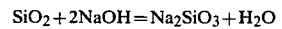

The obtained vitrified body is represented by the formula: $xR_2O.zSiO_2.xR_2O.yRO.zSiO_2$, wherein R stands for B, Al, Li, Na, or other ordinary glass components elements, and x, y and z for the proportions of the respective oxide components.

Figure 2:
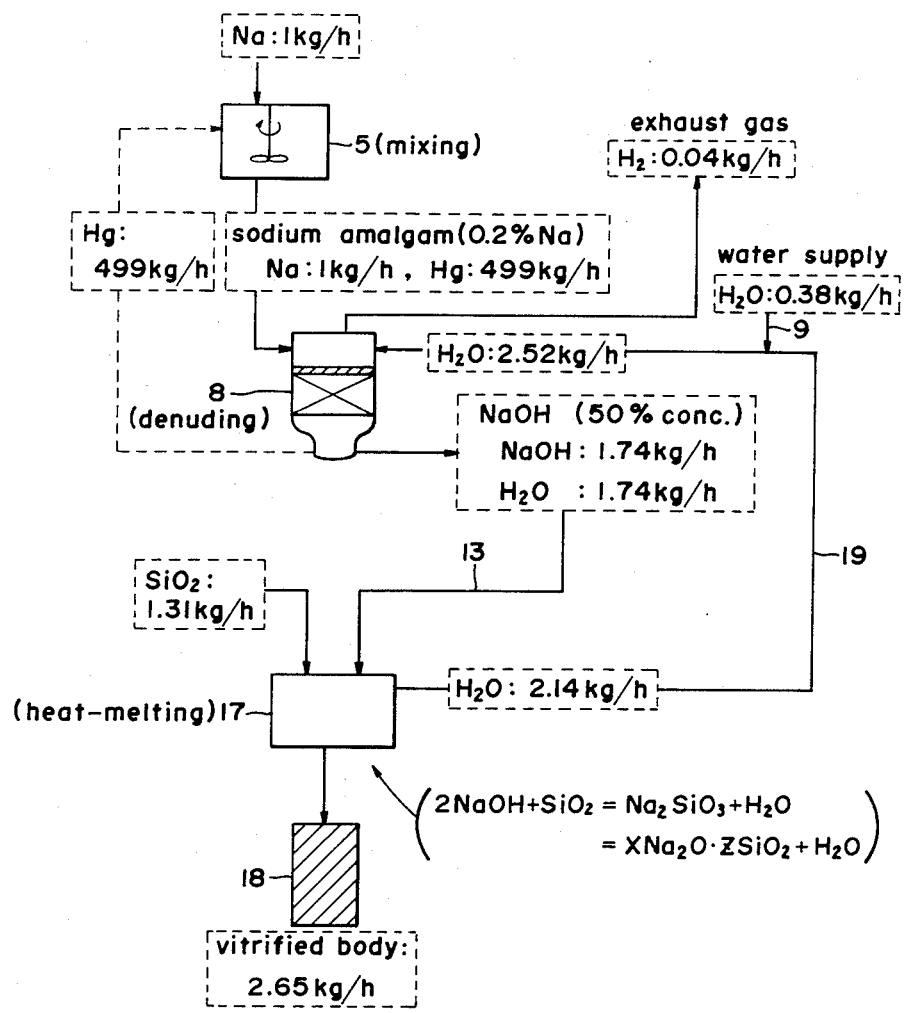
FIG. 2 shows an example of the material balance realized in the present invention.

The water formed in the heat-melting furnace 17 was recycled to the denuding tower 8. An example of the material balance is shown in FIG. 2. As understood from the Figure, a favorable balance was realized.

While the invention has been described with respect to specific embodiments, it is to be understood that variations and modification thereof may be made by those skilled in the art without departing from the scope of the invention.

What is claimed is:

1. A process for the treatment of radioactive sodium, comprising the steps of forming radioactive sodium amalgam by mixing radioactive sodium with mercury; reacting said radioactive sodium amalgam with water to form mercury and radioactive sodium hydroxide; recycling said mercury into the step of forming radioactive sodium amalgam to be mixed with the radioactive sodium; and solidifying said radioactive sodium hydroxide in the presence of a solidifying material to be confined in a stable solidified body.

2. The process according to claim 1, wherein the radioactive sodium hydroxide is solidified after being neutralized with an acid.

3. The process according to claim 1, wherein the solidifying material is selected from a vitrifiable substance, a plastics, a cement or an asphalt.

4. The process according to claim 1, which further comprises separating a part of the radioactive sodium amalgam to be heated to form vaporized mercury and a residue containing radioactive impurities, said radioactive impurities being entrained with the radioactive sodium and contaminating the radioactive sodium amalgam; recycling said vaporized mercury into the step of forming radioactive sodium amalgam to be mixed with the radioactive sodium; and solidifying said residue containing radioactive impurities in the solidifying step.

5. The process according to claim 1, wherein the solidifying material is glass, and the solidifying step comprises heat-melting the radioactive sodium hydroxide with glass.

6. The process according to claim 5, wherein water contained in an exhaust gas generated during the heat-melting of the radioactive sodium hydroxide with glass is recycled for reuse in the step of reacting the radioactive sodium amalgam with water.

* * * * *